(No Model.) 2 Sheets—Sheet 1.

G. DE LAVAL.
TURBINE FOR STEAM AND OTHER MOTIVE POWERS.

No. 285,584. Patented Sept. 25, 1883.

Witnesses:
Fred Haynes
Ed. L. Moran

Inventor:
Gustaf de Laval
by his Attorneys
Brown & Brown (No Model.) 2 Sheets—Sheet 2.

G. DE LAVAL.
TURBINE FOR STEAM AND OTHER MOTIVE POWERS.

No. 285,584. Patented Sept. 25, 1883.

Witnesses:
Inventor:
Gustaf de Laval
by his Attorneys
Brown & Brown

UNITED STATES PATENT OFFICE.

GUSTAF DE LAVAL, OF STOCKHOLM, SWEDEN.

TURBINE FOR STEAM AND OTHER MOTIVE POWER.

SPECIFICATION forming part of Letters Patent No. 285,584, dated September 25, 1883.

Application filed July 28, 1883. (No model.)

*To all whom it may concern:*

Be it known that I, GUSTAF DE LAVAL, doctor of philosophy, of Stockholm, in the Kingdom of Sweden, have invented certain new and useful Improvements in Turbine Motors for Steam and other Motive Power, of which the following is a specification, reference being had to the accompanying drawings.

This invention relates to turbine motors in which the turbine has a central supply and direct action, and in which the shaft or axle of the turbine wheel is geared by means of friction bevel-wheels with the driving-shaft to which the motion is to be transmitted. The turbine wheel consists of one, two, or more curved tubes, the inner ends of which have a direction corresponding with that of the axis of rotation, and are presented toward inlet-pipe for the driving-fluid. The tubes are mounted between two metal disks, one of which is furnished with a boss or hub, by means of which the wheel is fastened to the free end of the shaft or axle of the turbine. This axle is capable of sliding to some extent longitudinally in its bearing or bearings, for a purpose that will afterward be explained. The driving-fluid, steam or water, enters the curved tubes in direction of the axle, and exerts on the latter a pressure in its longitudinal direction, in consequence of which, and owing to the play of the axle lengthwise, the small bevel friction-wheel fastened to the axle is pressed against the large bevel friction-wheel of the shaft to which the motion has to be transmitted. At the same time the driving-fluid passes through the tubes and turns the turbine by reaction. In order to prevent the small friction bevel-wheel from losing its hold on the large one, it will be necessary to have the pressure between their surfaces not less than three times as great as the maximum value of the driving-power of the two wheels. The whole machine may practically be inclosed in a cast-iron casing containing the bearings for both shafts, as well as inlet and outlet openings for the driving-fluid.

Figure 1:
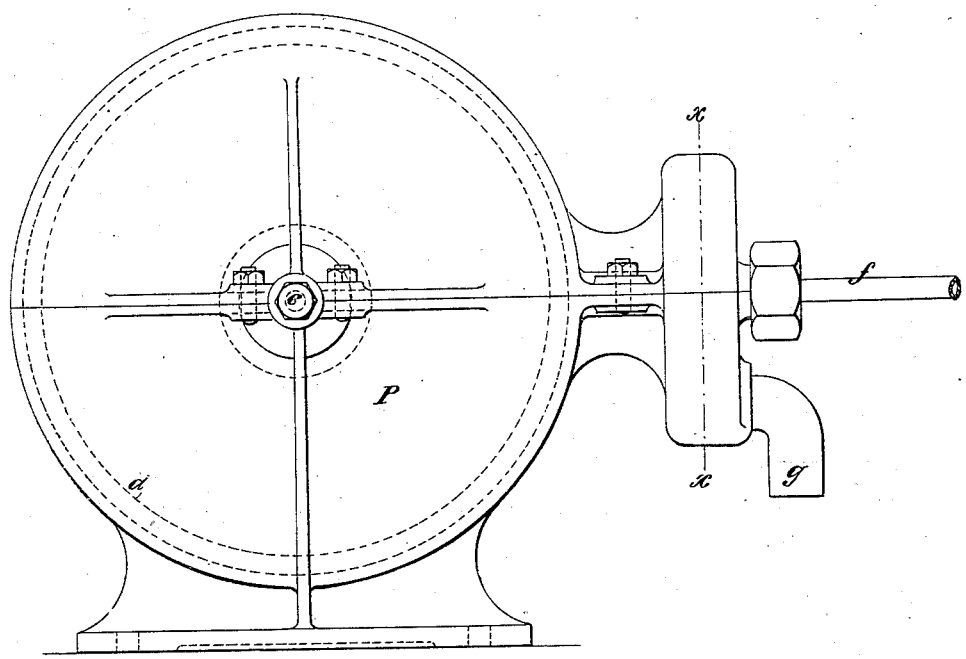
Figure 2:
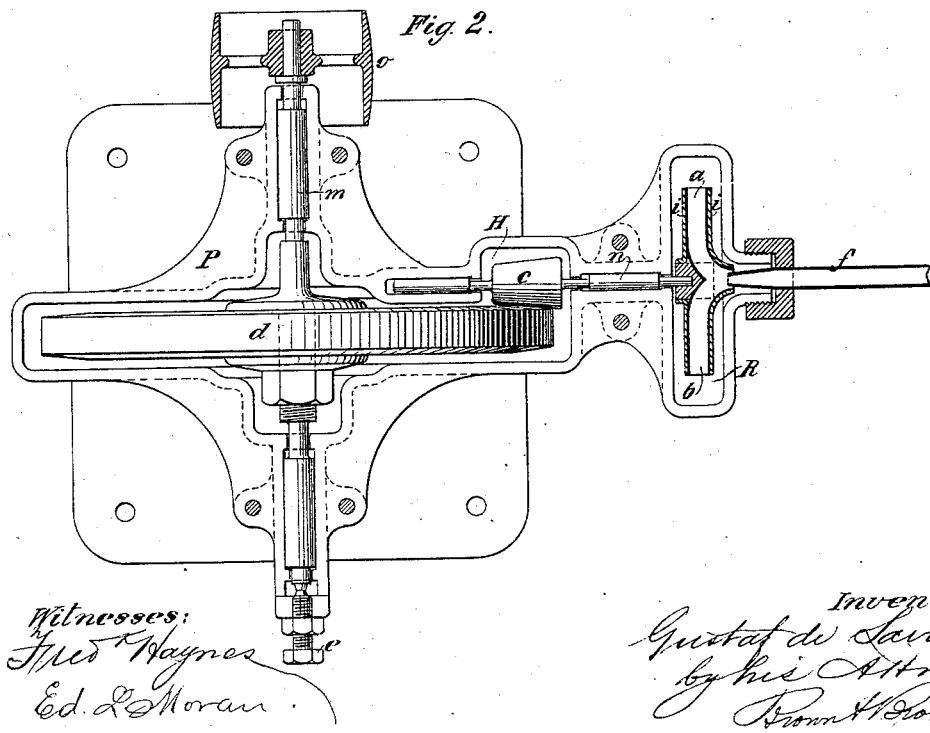
Figure 3:
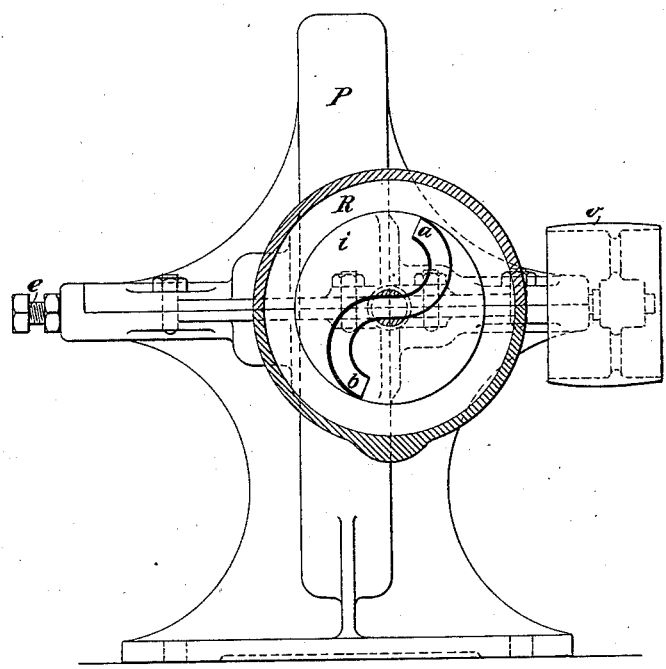

Figure 1 in the accompanying drawings is an elevation of a turbine motor constructed according to my invention. Fig. 2 is a horizontal section of the same in the plane of the axis of the two shafts. Fig. 3 is a vertical section of the same in the plane indicated by the line $x$ $x$ of Fig. 1.

$i$ $i$ are two disks, between which two curved tubes, $a$ and $b$, of the turbine wheel are fastened. R is the casing of the turbine, having the inlet $f$ for steam, water, or other motive fluid, and an outlet, $g$. $n$ is the turbine shaft, capable of sliding longitudinally in its bearings and fastened in the hub of the disk $i$. $m$ is the main shaft, driven by the turbine and furnished with a pulley, $o$, for the transmission of power. $c$ $d$ are the bevel friction-gears through which the turbine shaft drives the shaft $m$. $e$ is a set-screw for the bevel friction-gear. P is a casing for the wheel $d$ and shaft $m$. H is casing for $c$. The several casings may all be cast to the base or frame of the machine.

What I claim as my invention is—

The combination, with the main shaft $m$ of the turbine motor, furnished with a bevel friction-wheel, $d$, of the turbine wheel, consisting of one or more tubes, $a$ $b$, and disks $i$ $i$, and the shaft of which, furnished with a bevel friction-wheel, $c$, is capable of sliding in its bearings, for the purpose of permitting the said wheel $c$ to be pressed into contact with $d$ by the pressure of the motive fluid on the turbine wheel, substantially as described, and as illustrated in the accompanying sheet of drawings.

GUSTAF DE LAVAL.

Witnesses:
F. ENGEL,
F. CLAIRMONT.